Jan. 5, 1954     A. C. WINTERHALTER     2,665,420
RADIANT ENERGY SYSTEM FOR DISTANCE MEASURING
Filed April 19, 1949                    5 Sheets-Sheet 1
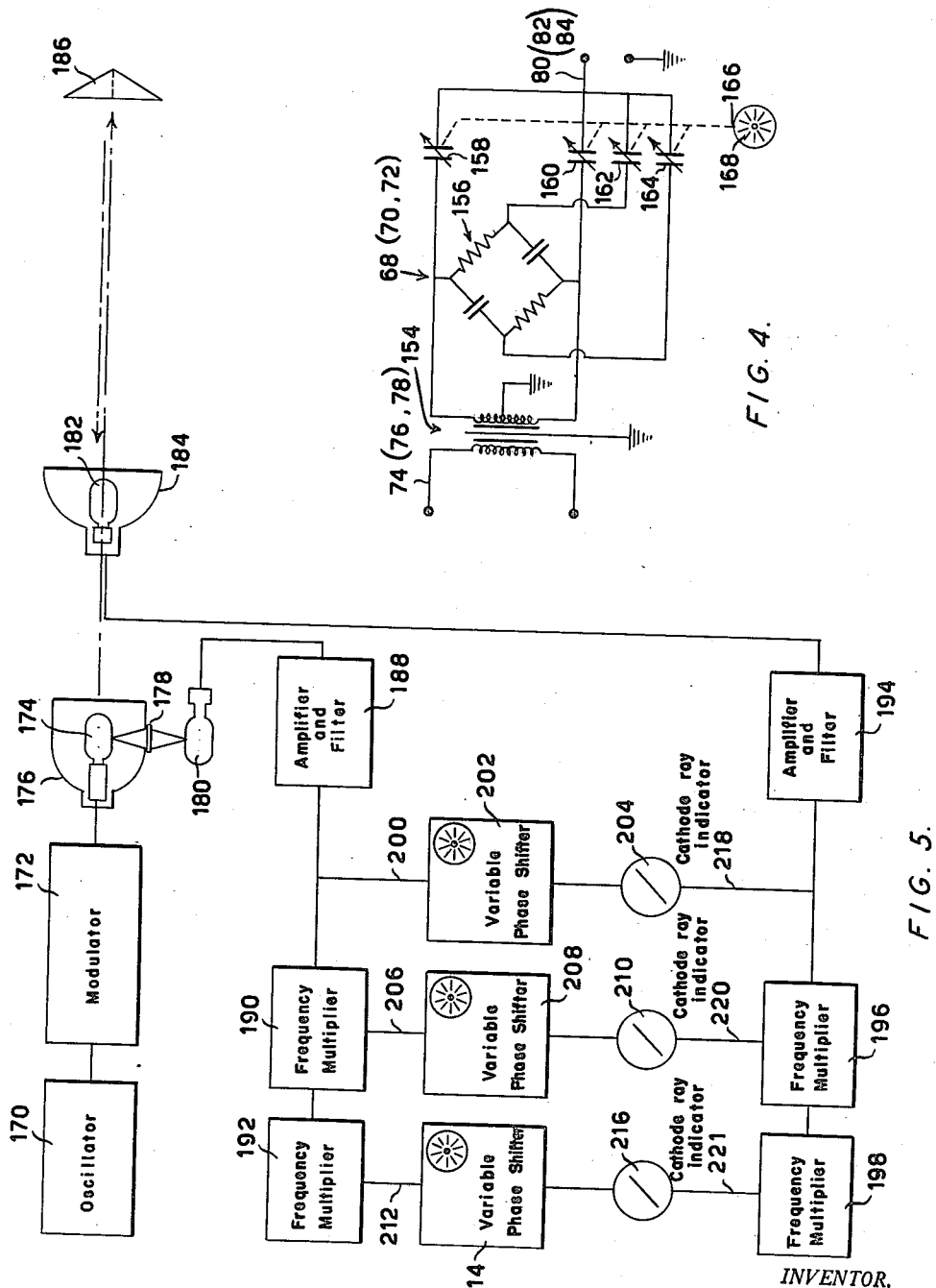
INVENTOR.
ALFRED C. WINTERHALTER
BY
ATTORNEYS

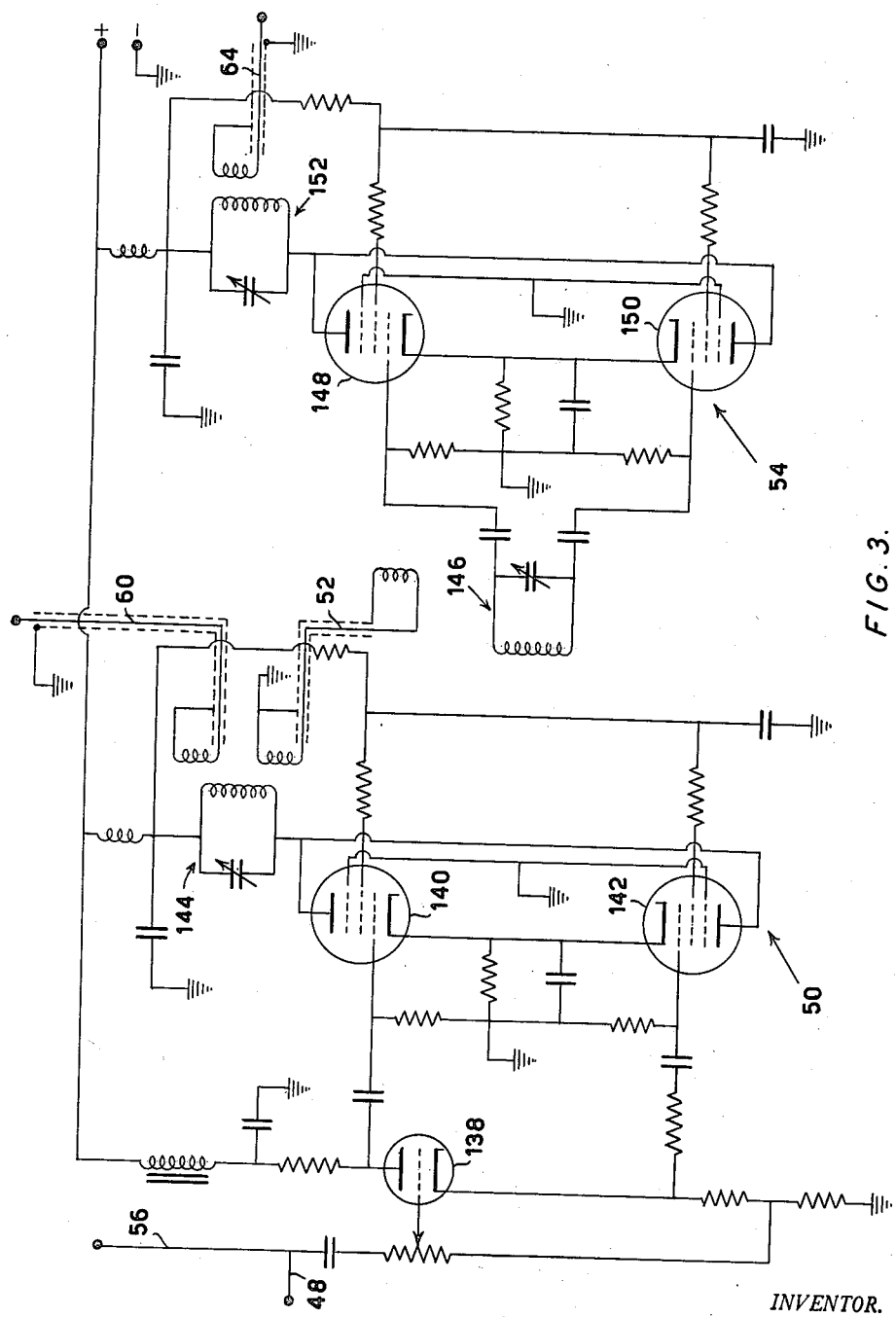

INVENTOR.
ALFRED C. WINTERHALTER

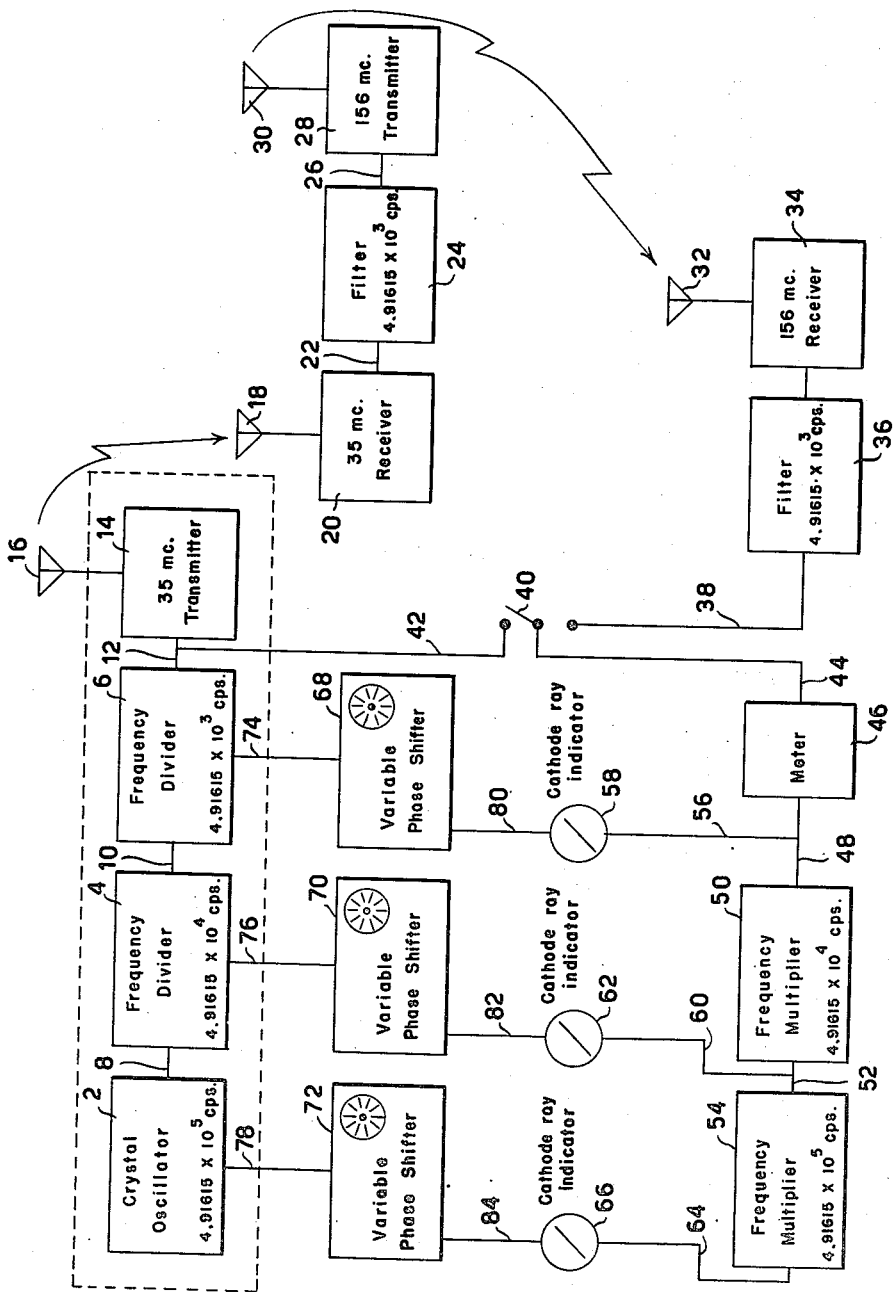

Patented Jan. 5, 1954

2,665,420

UNITED STATES PATENT OFFICE 2,665,420

RADIANT ENERGY SYSTEM FOR DISTANCE MEASURING

Alfred C. Winterhalter, Beaumont, Tex., assignor to Sun Oil Company, Philadelphia, Pa., a corporation of New Jersey Application April 19, 1949, Serial No. 88,344

4 Claims. (Cl. 343—12)

1

This invention relates to a ranging system for the measurement of distances.

Measurement of distances by electromagnetic radiation has been carried out in various fashions, including the use of pulses requiring operation at very high frequencies. Such pulses or radar devices are inherently quite complicated and critical in operation and involve reflection from a target. This last condition requires the provision of an identifiable target, if a range to a particular location is desired, which, in general, must be in a direct line of sight with respect to the transmitter.

Another type of ranging device involves the use of a variable frequency transmitter to send signals to a receiver-transmitter unit by which signals are returned to the sending station and compared with the signals being transmitted, the difference in frequency between the signals being transmitted at a certain instant and those received at the same instant being detected and giving a measurement of the round-trip transit time. This apparatus is also quite complicated and requires the exercise of various precautions to insure accuracy of measurement.

It is the general object of the present invention to provide a ranging system of relatively simple type capable of measuring distances to a high degree of accuracy. It will be evident that if a signal of given frequency were sent out by a transmitter and at a distant point received and retransmitted back to the sending station the phase relationship of the received to the transmitted wave at any instant would constitute a measure of distance, taking into account the fact that the phase relationship could differ by integral wave lengths as well as fractions of a wave length depending upon the frequency which was used and assuming that electrical delays in the apparatus employed constituted known constants. However, to the extent so generally stated an arrangement of this sort involves several difficulties which will be immediately apparent. If a long wave is transmitted so that there is less than a 360° difference in phase between the received and transmitted waves it would be necessary to measure the phase displacement to a quite unattainable degree of accuracy to secure any accuracy of measurement of the range. Furthermore, if this condition of less than 360° phase difference is involved it will be evident that only relatively short ranges could be measured because the frequencies would otherwise be so low as to involve a very low degree of radiation.

On the other hand, if high frequencies are

2 used it would be necessary to measure the number of integral wave lengths as well as fractions thereof and this would involve some provision of rather complicated means for providing trains of waves so that a reference for the commencement of counting of waves could be provided.

In accordance with the present invention the first of the two schemes just mentioned is adopted but with provision for the accurate measurement of phase relationships through the utilization of harmonics of the long transmitted wave which is used to modulate a carrier in the form of a high frequency radio wave or in the form of a light beam. In brief, the system involves the generation of a high frequency with a plurality of divisions of this frequency by frequency dividers to produce subharmonics of the generated frequency, the lowermost of which is caused to modulate a radio transmitter or a light source to send the modulated radio or light beam to a distant receiver. This beam is, in effect, reflected by the receiving apparatus, either by actual reflection in the case of the light beam or through retransmission in the case of a radio wave. The signal thus reflected is received at the transmitting station and by frequency multiplication is transformed back to the original generated frequency and harmonic frequencies corresponding to those produced in the transmitter. The corresponding frequencies are then compared in phase so that a series of measuring devices measure the phase differences at all of the various frequencies. The measuring devices comprise dials which, when adjusted, may be read in terms of long units and definite fractions thereof. For example, one dial may measure in units of 10,000 feet, a second dial in units of 1,000 feet, and a third dial in units of 100 feet, the last being calibrated to measure fractions of this unit. By merely summing the readings of the dials a direct reading of range may thus be obtained. As will become evident hereafter, the apparatus is so constructed and operated that constant delays or phase displacements in the sending and receiving apparatus become merely constants of the apparatus which may be taken into account in preliminary calibration so that the ranging apparatus becomes direct reading to a high degree of accuracy.

The broad object of the invention indicated above, as well as subsidiary objects relating particularly to details of the means for accomplishing the results stated will become apparent from the following description read in conjunction with the accompanying drawings in which:

Figure 1 is a block diagram indicating the vaus elements of the ranging system and making ar its overall operation;

Figure 3 is a wiring diagram showing the frequency multipliers at the sending station;

Figure 4 is a wiring diagram showing the construction of a variable phase shifter of which several are embodied in the apparatus;

Figure 5 is a diagram similar to Figure 1 but showing the apparatus suitable for the transmission and utilization of a modulated light beam.

Figure 2:
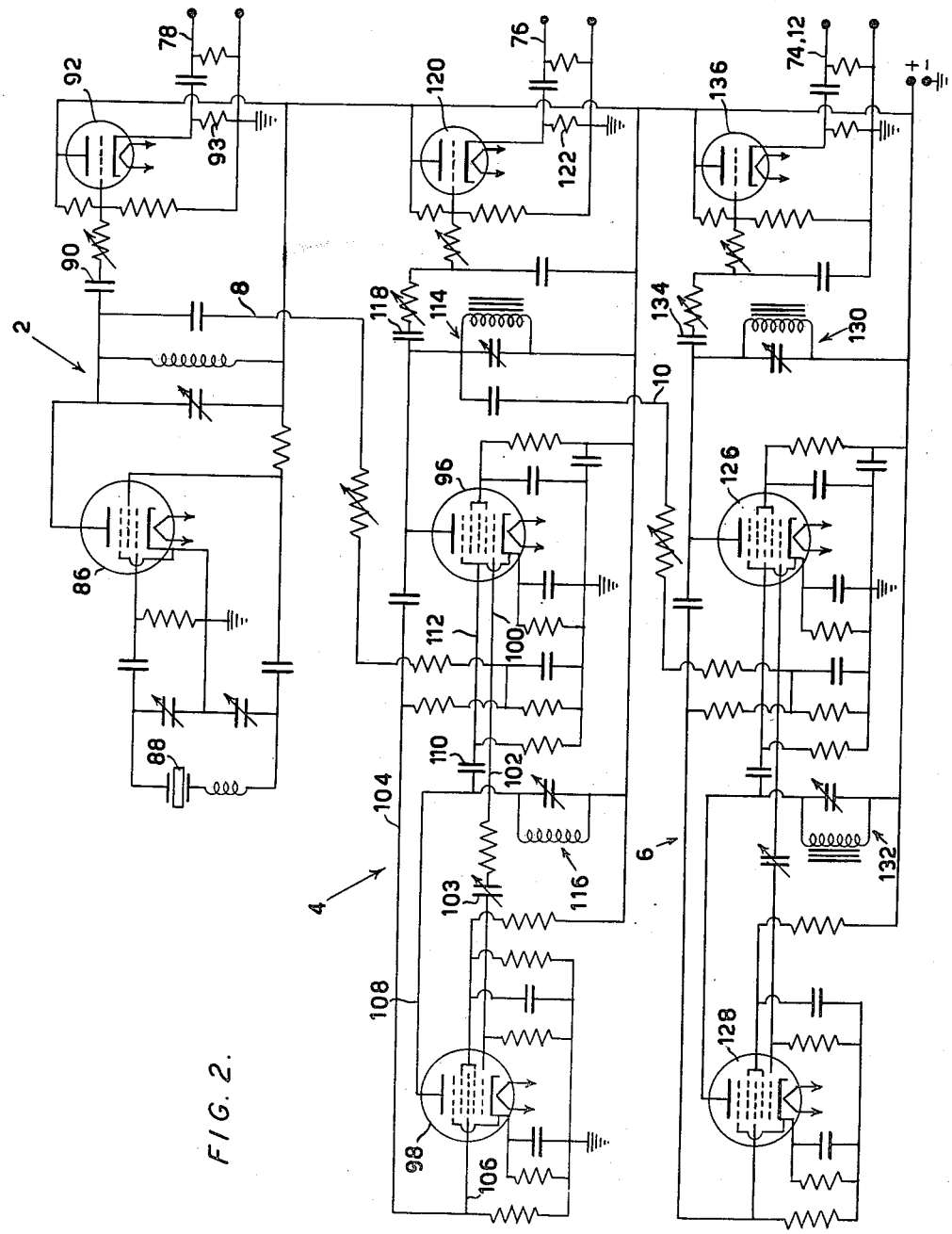
Figure 2 is a wiring diagram showing the signal generator and frequency dividers associated therewith.

Reference may be made first to Figure 1 for a general understanding of the elements of the system and their operation.

A crystal oscillator 2 is provided to generate current at a frequency which is maintained accurately constant as may be done by utilizing a quartz crystal subject to temperature regulation with other precautions such as are well known in the radio art for maintaining precise frequency generation. While, as will be evident, various frequencies may be used, it is convenient to choose an oscillator frequency which will give rise to ultimate measurements in terms of the units to be used multiplied by factors of the powers of ten. For consistency of description it may assumed that measurements are to be made in feet in the decimal system and for this purpose the crystal oscillator may conveniently generate a frequency of $91615 \times 10^5$ cycles per second. If a wave of this frequency were transmitted to a point 1,000 feet distant from the transmitter and there instantaneously reflected back to the transmitter there would be a 360° phase change between the transmitted and received waves. The choice of this frequency accordingly gives rise to ultimate measurements in terms of feet in the decimal system.

The crystal oscillator delivers through connection 8 to a frequency divider the generated signal and in this frequency divider a division by 10 is effected to give rise to a signal having a frequency of $4.91615 \times 10^4$ cycles per second. This signal, in turn, is fed through connection 10 to a second frequency divider where there is again division by the factor of 10 to give rise to a signal having a frequency of $4.91615 \times 10^3$. This last signal in the audio range is fed through connection 12 to modulate a radio transmitter which may transmit at any desired frequency, for example as indicated in Figure 1, the frequency of 5 megacycles. The modulated wave radiated from its antenna 16 is received by the antenna 18 of a receiver-transmitter unit located at a station the distance to which from the sending station is to be measured. At this remote station there is provided the 35 megacycle radio receiver 20 of conventional type which delivers to the output 22 the modulating signal of the frequency $4.91615 \times 10^3$. A filter 24 having a narrow band pass characteristic at this frequency may be provided to insure that only this modulating frequency is passed through connection 26 to modulate a radio transmitter 28 set to transmit a carrier at some convenient frequency as, for example, 156 megacycles as indicated through its antenna 30 from which this carrier modulated at the signal frequency of $4.91615 \times 10^3$ cycles per second is radiated. It may be here noted that the elements assembled at this remote station may be entirely conventional, the only requirement being that the receiver, filter and transmitter should be stable to such extent as to involve a highly constant phase displacement of the modulating signal. Desirably, suitable circuit arrangements are provided in accordance with well known practices to maintain the phase change from the receiving antenna to the transmitting antenna at zero; but as will become evident, even if a phase shift occurs it will make no difference so long as it is maintained constant.

At the sending station antenna 32 and receiver 34 are provided to receive the modulated signal radiated from the antenna 30. The receiver 34 is also conventional and is arranged to deliver to a filter 36 the modulating frequency of $4.91615 \times 10^3$ cycles per second. The filter 36 may have the same characteristics as the filter 24 to segregate the desired detected modulating frequency from other audio frequencies which might otherwise cause interference. From the filter 36 the audio frequency signal is delivered to a meter 46 through connection 44 which is joined to a single-pole double-throw switch 40 arranged to connect 44 either with the connection 38 for operation or with the connection 42 which joins the connection 12 previously mentioned for test purposes. The meter 46 is desirably included so that an operator may maintain the amplitude of the audio frequency signal substantially constant by adjustment, if necessary, of the degree of amplification in the receiver 34.

From the meter 46 the signal at $4.91615 \times 10^3$ cycles per second is passed through connection 48 to a frequency multiplier which, by multiplying the frequency by 10, gives rise to a signal having the frequency of $4.91615 \times 10^4$ cycles per second. This last signal is fed through connection 52 to a second multiplier which again by multiplication by 10 gives a signal of the frequency of $4.91615 \times 10^5$ cycles per second. The respective signals are fed from the meter and the first and second frequency multipliers through connections 56, 60 and 64, respectively, to the respective horizontal (or vertical) deflecting plates of the cathode ray indicators 58, 62 and 66. Through connections 74, 76 and 78 the signals, respectively, from the frequency divider 6, the frequency divider 4, and the oscillator 2, are fed to the variable phase shifters 68, 70 and 72 and thence through connections 80, 82 and 84 to the vertical (or horizontal) deflecting plates of the cathode ray indicators 58, 62 and 66.

From the foregoing it will be evident that distances from the sending station to the remote reflecting station may be determined to a high degree of accuracy if the phase shifters through calibrated dials are adjusted to produce inphase conditions of the pairs of inputs to the cathode ray indicators as evidenced by the production of straight line traces thereon. This assumes, of course, that constant characteristics of operation exist in the various parts of the apparatus so as to be taken care of either by the use of constant corrections applied to the results or by the original calibration of the variable phase shifter dials. The major significance from the standpoint of accuracy is, of course, involved in the matter of adjustment of the phase shifter 72 which may be calibrated to represent 1,000 feet in a complete rotation of its dial. In effect, it indicates the phase shift of less than 360° which occurs added to complete periods of phase shift which would occur if the frequency of the crystal oscillator 2 was transmitted to the remote station and reflected back to the sending station. Actually, of course, a wave of a frequency one-hundredth of the oscillator frequency is actually transmitted. The dial of the phase shifter 70 corresponds, for a full revolution, to the transmission of ten waves at the oscillator frequency while the dial of the phase shifter 68 in a full revolution would correspond to one hundred such wave lengths. It will be evident that distances may be read directly in decimal fashion from the phase shifter dials. Calibration of the apparatus may be originally effected by locating the remote station at a definite distance from the sending station. The delay constant of the remote station may thus be ascertained and if the conventional elements of this station are well constructed this delay may be regarded as constant. The delays existing in the elements at the sending station may be determined by throwing the switch 40 to its upper position to engage the connection 42. With the switch in this position, adjustments of the oscillator, frequency dividers, frequency multipliers, phase shifters and cathode ray indicators may be made to a zero or arbitrary setting, and subsequent similar positioning of the switch 40 may be used as a periodic check to ascertain that no drift, which would result in false or erroneous distance measurements, has occurred. If drift has occurred, correction may be made by means of the phase shifters. It may be noted that the circuits, the details of which will be now described, are of types capable of insuring constancy of operation and phase relationships, and substantially the only requirement after preliminary settings are made and fixed to insure proper and accurate results is that of maintaining the meter readings 46 substantially constant since the results may be slightly affected if the current flow through the line 44 changes substantially in amplitude.

That the apparatus of the above type will perform the functions indicated will become apparent from consideration of those elements which are not highly conventional.

Figure 2 shows the crystal oscillator 2 and the frequency dividers 4 and 6 which deliver the outputs through the connections 78, 76, 74 and 12. As indicated heretofore the transmitter 14 which receives the output from the last mentioned connection is conventional and need not be described in detail.

The oscillator comprises a pentode 86 connected in conventional fashion to the crystal 88 which is ground to oscillate at the frequency of $4.91615 \times 10^5$ cycles per second. This crystal should not only be accurately ground but should be so operated in accordance with conventional practices to maintain frequency control to a high degree of accuracy through the use of thermostatic control as well as definite mechanical and electrical stability of the elements associated therewith. The oscillator also comprises the amplifier 92 coupled to it through the condenser 90, the output of the amplifier to the connection 78 being taken from across the cathode resistor 93. The connection 8 to the first frequency divider 4 may be taken directly from the oscillator output.

The frequency divider 4 may take various forms but is most desirably of a type similar to that described in the article of F. R. Stansel entitled "A secondary frequency standard using regenerative frequency-dividing circuits" in the Proceedings of the I. R. E. of April 1942, page 157. A illustrated in Figure 2 this divider comprise a pair of pentagrid converter tubes 96 and 98 interconnected as illustrated. The operation o this divider may be best understood by startin with an assumption (later to be justified) tha the output of the tube 96 contains a frequenc component $$\frac{f}{n}$$

wherein $f$ is the frequency input to the first control grid of the tube 96 from the line 8 through the connection 100 and $n$ is the divider constant. The tuned circuit indicated at 114 is tuned to the frequency $$\frac{f}{n}$$

It will be noted that the first control grids of the two tubes 96 and 98 are connected through 100 and 102, the latter involving the variable condenser 103 for controlling the input to tube 98.

The output from the anode of the tube 96 is fed through the connections 104 and 106 to the second control grid of the tube 98 which functions as a harmonic generator. Connected to the anode of the tube 98 through the line 108 is the tuned circuit 116 which is tuned to the frequency $$\frac{n-1}{n} \cdot f$$

On the basis of the first assumption made it will be evident that the output of the harmonic generator which is fed through the condenser 110 and line 112 to the second control grid of the tube 96 will contain a high proportion of the component of frequency.

$$\frac{n-1}{n} \cdot f$$

The tube 96 constitutes a modulator and since its first control grid is fed with a frequency $f$ and its second control grid is fed with a frequency $$\frac{n-1}{n} \cdot f$$

sum and difference frequencies would appear in its output, the difference frequency being $$\frac{f}{n}$$

which, by the filter action of the tuned circuit 114, will be fed by the output condenser 118.

By virtue of the feedback of the frequency $$\frac{f}{n}$$

the circuit once started is self-sustaining and this frequency output is controlled by the input at frequency $f$, which, together with the tuned circuits at 114 and 116, insures highly stable delivery of the subharmonic. In the particular apparatus which is indicated $n$ is, of course, equal to 10. It may be noted that the circuit 116 may be tuned to the frequency $$\frac{n+1}{n} \cdot f$$

with equivalent results.

By the divider circuit just described not only is the desired subharmonic produced but it is produced in very constant phase relationship with the fundamental frequency, this phase relationship being very accurately maintained parlarly by reason of the feeding of the fundamental frequency to the first control grid of the tube 98.

An amplifier tube 120 is desirably connected to the output of the divider 4 and the output of this amplifier is delivered to the connection 76 from across the cathode resistor 122.

The second divider 6 is essentially identical with the divider 4 with the exception, of course, that its tuned circuits 130 and 132 associated with its tubes 126 and 128 are tuned for correspondingly lower frequencies. This divider delivers through the condenser 134 to the amplifier containing tube 136 a further subharmonic which, in the specific case herein involved, has a frequency one-hundredth the frequency of the fundamental. The output of the amplifier is delivered to the lines 74 and 12.

Whereas frequency division is required in the transmitter at the sending station, frequency multiplication must be provided in connection with its receiver. The frequency multipliers 50 and 54 and their connections are detailed in Figure 3. An input amplifier tube 138 connected to the input line 48 provides the drive for the pentodes 140 and 142, the anodes of which are connected together and to a circuit 144 tuned to resonance at ten times the frequency of the input. The push-push arrangement to the tubes 140 and 142 is provided to eliminate odd harmonics with a resulting suppression of the odd harmonics above and below the desired tenth harmonic which is delivered through the connections 60 and 52.

The second multiplier 54 is fed from the first through the link connection 52 which is coupled to the circuit 146 tuned to the frequency of the harmonic output of the previous multiplier. Tubes 148 and 150 in the second multiplier correspond to the tubes 140 and 142 of the first and have their anodes connected together and to the circuit 152 tuned to resonance at the frequency corresponding to the hundredth harmonic of the fundamental, this frequency being in accordance with the foregoing $4.91615 \times 10^5$ cycles per second. The output from the circuit 152 is delivered to the connection 64 previously described.

The frequency multiplier arrangement which described, like the divider, is highly satisfactory in respect to stability and the constancy of maintenance of phase relationships between the fundamental and its harmonics which are used.

Figure 4 illustrates one of the variable phase shifters 68, 70 and 72 which may be identical in construction except for values of their parameters which should be suited to the respective frequencies involved. The inputs to these are provided from the connections 74, 76 and 78 through transformers such as 154. In each phase shifter the output of the transformer 154 is delivered to a resistance-capacitance bridge 156, the four terminals of which are connected to the fixed plates 158, 160, 162 and 164 of condensers with respect to which fixed plates there rotate movable plates connected to the output lines 80, 82 or 84, the movable plates being carried by a common shaft 166 carrying the calibrated dial 68. This type of phase shifter is well known, being described, for example, in Terman's Radio Engineers' Handbook, McGraw-Hill Book Company, 1943, page 949. This type of phase shifter is so constructed through proper relationships of the plates that its dial may be calibrated linearly with phase shift angle, a complete rotation of the dial representing a phase shift of 360 electrical degrees.

It will be evident from the foregoing that the mode of operation previously described in detail may be achieved with accurate measurement of range directly indicated on the dials of the phase shifters when the cathode ray indicators are adjusted to a zero phase relationship between the inputs of the horizontal and vertical deflector plates. Merely by properly setting the dials on their shafts constant phase shifts which may exist in the elements of the system may be taken into account, though alternatively, of course, corrections may be applied to the readings of dials which are more arbitrarily set.

In Figure 5 there is disclosed a modification of the invention involving the use of light instead of radio waves for the transmission to and from the receiving station. This also involves a somewhat different electrical system which, as will be hereafter evident, could be utilized in a radio transmission system.

In the system of Figure 5 there is provided at 170 a timing oscillator which may desirably produce an audio frequency output at $4.91615 \times 10^3$ cycles per second or some multiple of this as, for example, a frequency double this frequency. This oscillator should be capable of maintaining the frequency constant to a high degree of precision and, consequently, may consist of a crystal oscillator such as 2 associated with frequency dividers such as have been previously detailed. The output of the oscillator unit is fed to a unit 172 which constitutes a power source and modulator for providing current to a lamp 174 of an arc type which is susceptible to modulation at relatively high audio frequency. Such arc lamps are known and are manufactured by the General Electric Company and others. One such lamp is described in an article by W. D. Buckingham and C. R. Deibert entitled "The concentrated arc lamp" in volume 36, page 45, 1946, of the Journal of the Optical Society of America. Utilizing such a lamp a modulated beam of light may be produced which is concentrated by the use of a reflector 176. This reflector is provided with an opening in a side wall thereof covered by a neutral filter 178 to transmit a low intensity from the lamp to a photocell 180 located adjacent to the lamp.

The light projected from the lamp 174 is directed to a receiving station at which there is located a reflector of the type indicated at 186 comprising the interior of a corner of a cube provided with reflecting surfaces. Such a reflector has the well-known property of reflecting substantially directly back to the source light impinging thereon irrespective of the orientation of the reflector within limits, the reflection taking place due to multiple reflections from the trihedral surfaces. The use of such a reflector is desirable since it eliminates the necessity for any accurate adjustment of the reflector at the receiving station; in fact, by the use of a suitable set of such reflectors it is possible to have the receiving station completely unattended since at least one of them would be in a position at all times to reflect light back to the sending station.

To receive the reflected light a photocell 182 is provided within a concentrating reflector 184 closely adjacent to the transmitting lamp 174. There is thus provided a total path of light from the lamp 174 to the photocell 182 which has a length equal to twice the range.

The output of the photocell 180 is fed to an amplifier and filter indicated at 188 which delivers the modulating frequency to a pair of frequency multipliers 190 and 192 which may be of the type previously described. The output of the amplifier and filter unit 188 and the output of the frequency multipliers are respectively fed through connections 200, 206 and 212 to phase shifters which may be identical with those previously described and from which there are fed one set of deflecting plates in each of the three cathode ray indicators 204, 210 and 216.

The output from the photocell 182 is similarly fed to an amplifier and filter unit 194 to deliver the modulating frequency to the multipliers 196 and 198 also of the type previously described. The amplifier and filter unit 194 feeds through the connection 218 and the frequency multipliers feed through the connections 220 and 221 the other sets of deflecting plates of the cathode ray indicators.

It will be evident that the operation of the system in Figure 5 is substantially the same as the modification of Figure 1 in that comparison may be made of the phases of the local and received signals at the modulating frequency and multiples of this frequency. The cathode ray indicator 210 is operated, for example, at a frequency of $4.91615 \times 10^4$ cycles per second and the cathode ray indicator 216 is operated at $4.91615 \times 10^5$ cycles per second. The cathode ray indicator 204 may be operated at the modulating frequency which may be either $4.91615 \times 10^3$ cycles per second or some multiple thereof; for example, the frequency of modulation and that of operation of this indicator may be twice this basic frequency, this double frequency being desirable since the modulating efficiency of the lamps indicated is sufficiently satisfactory at as high as 10,000 cycles per second, and the higher the frequency the less frequency multiplication is required.

It will be noted that in this case both of the sets of frequencies for comparison are derived from receiver elements and it will be evident that a similar arrangement could be utilized in the system of Figure 1 in which the local signals could be produced from the line 74 through multiplication rather than directly from dividers since the two frequency multiplying systems may be made identical. There can thus be secured further insurance that a minimum of phase shift drift might occur in the compared systems.

It will also be evident that instead of using a mere reflector for the light the modulated light at the receiving station could be received by a photocell utilizing this to modulate a light source at the receiving station. This, however, involves rather unnecessary complication since a reflecting system of the type indicated is quite satisfactory. The fact that the light beam is modulated eliminates interference due to sunlight or the the presence of other illumination.

While it is desirable to use sinusoidal waves for the modulation of the high frequency or light beam carriers and also for comparison of phase, it will be evident that waves of other shapes may be used. The circuits which have been described are particularly effective in giving good sine wave outputs.

While the systems described involve returning from the receiving station to the sending station carriers modulated at the same frequency as the carrier transmitted from the sending station, it will be evident that, if desired for any reason, the receiving station may send back a carrier modulated at a frequency which is a multiple or submultiple of the original modulation frequency.

Figure 6:
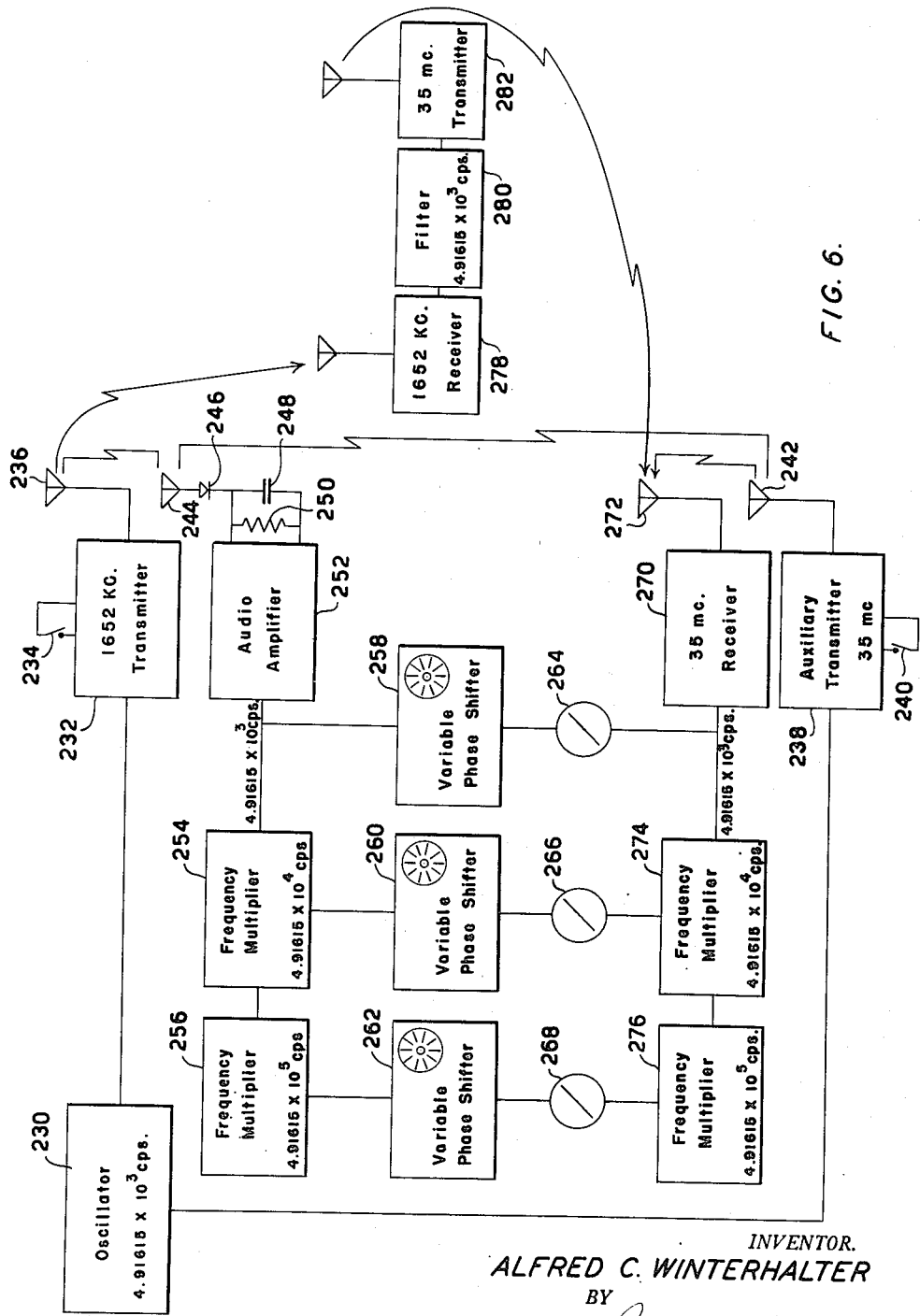
Figure 6 is a diagram similar to Figure 1 but showing apparatus particularly designed to minimize the effects of drift of operation of its components.

Drifts in the phase characteristics of the apparatus described tend to occur due particularly to thermal changes during operation unless special precautions are taken in the design of circuit elements to minimize such drifts. While temperature control and controls of supply voltages may substantially eliminate drift, to the extent that it produces errors in the measurements of distance, it is somewhat more convenient, even at the expense of additional apparatus, to utilize an arrangement which provides for the easy compensation for drifts which may occur, so that no particular compensating thermostatic or voltage regulation need be used, or if used, need not be so critical in corrective functions. Figure 6 diagrams a system which is desirable for this end, the arrangements being generally similar to those previously described so that they need not be individually discussed in detail.

There is provided at 230 an oscillator having an output frequency of $4.91615 \times 10^3$ cycles per second, which oscillator may be in the form of a crystal oscillator associated with frequency dividers such as previously indicated at 2, 4 and 6. The output of the oscillator 230 produces modulation of a transmitter 232 which may operate at a carrier frequency of 1652 kilocycles, as indicated in the drawing. (As will be evident the various figures here given are merely illustrative and need not be adhered to.) The keying switch of the transmitter 232 is indicated at 234 and the transmitter is arranged to produce radiation from its antenna 236.

The oscillator 230 also effects modulation of an auxiliary transmitter 238 provided with a radiation transmitter 232. This auxiliary transmitter is arranged to be keyed as indicated at 240. This auxiliary transmitter may operate at 35 megacycles. Both of the transmitters 232 and 238 are located at the sending station.

At the sending station there is provided an antenna 244 connected through a crystal rectifier 246 to the network comprising a condenser 248 and resistor 250 which feeds an audio amplifier 252. This arrangement is such as to receive signals at either the frequency of the transmitter 232 or the frequency of the transmitter 238. The audio amplifier 252 feeds the frequency multipliers 254 and 256 of the types heretofore described which multiply the basic frequency by ten and one hundred, respectively. Variable phase shifters of the type described are indicated at 258, 260 and 262, receiving their inputs from the amplifier 252 and the multipliers 254 and 256, respectively. The outputs of each of the phase shifters feed one set of deflecting plates of its associated cathode ray indicator of the group 264, 266 and 268.

A receiver 270 provided with an antenna 272 is tuned to receive the signals on a 35 megacycle carrier and feeds the frequency multipliers 274 and 276 which multiply the modulating frequency by ten and one hundred, respectively. The receiver 270 and the multipliers 274 and 276 feed the other sets of plates of the cathode ray indicators.

All of the apparatus so far described is located at the sending station and may be regarded from the standpoint of distance as at a single point.

The remote receiving station includes the receiver 278 tuned to the frequency of the transmitter 232, a filter 280 arranged to pass the freuency of 4.91615×10³ cycles per second, and a 5 megacycle transmitter 282. It will be noted that this receiving station is the same as that lustrated in Figure 1 except for the radio frequencies indicated.

In the operation of this arrangement the transmitters 232 and 238 are alternatively keyed. t will be noted that when the auxiliary transmitter 238 is keyed its signals are received by he antennae 244 and 272 which are both essentially at the same position as the auxiliary transmitter. Accordingly, the signals at the two receiving antennae should have the same phase and this should be indicated on the indicators 64, 266 and 268. If it is not, zeroizing adjustments may be made in the variable phase shifters, the dials of which may be adjusted on their shafts to secure an indication of zero phase condition.

When this has been done the transmitter 238 is taken out of operation by opening its key and the transmitter 232 is keyed to transmit its output to the local antenna 244 and to the antenna of the receiver 278 which, through the apparatus at the receiving station, effects retransmission from the transmitter 282 to the antenna 272 of the receiver 270. The apparatus at the sending station then compares the phase difference of the signals received at the antennae 244 and 272 to produce results similar to those described above.

From the foregoing it will be noted that the system having the inputs from the antennae 244 and 272 may be easily zeroized so that despite drifts which may occur in its components, which drifts are of a relatively slow type, a reading of distance may be made following a zeroizing operation without error due to drift. Accordingly, no particular precautions need be taken to avoid thermal or voltage drifts in the apparatus. Drifts in the high frequency system at the remote station will not occur to any appreciable extent from the standpoint of shifting phase of the modulating audio frequency signals, and the system is independent of drifts which may occur in the oscillator 230 or in the transmitter 232 or in auxiliary transmitter 238. The additional apparatus which is involved, accordingly, may be of relatively inexpensive and conventional type with elimination for the necessity for elaborate thermal and potential regulation.

What I claim and desire to protect by Letters Patent is:

1. A ranging system comprising a sending station and a receiving station, the sending station being provided with means for radiating to the receiving station a signal modulated at a single predetermined frequency and the receiving station being provided with means for radiating to the sending station a signal modulated at the first mentioned modulated frequency with the modulation of the last mentioned signal bearing a fixed phase relationship with the modulation of the first mentioned signal, means at the sending station to provide a set of signals of different frequencies bearing a predetermined frequency relationship to the first mentioned modulating frequency and in predetermined phase relationship with the modulation of the signal radiated from the sending station, means at the sending station responsive to the signal from the receiving station to provide a second set of signals of different frequencies equal to those of the first mentioned set of signals and bearing a predetermined phase relationship with the modulation of the signal received from the receiving station, and means for comparing the phase relationship of each pair of signals of the two sets having the same frequency.

2. A ranging system comprising a sending station and a receiving station, the sending station being provided with means for radiating to the receiving station a signal modulated at a single predetermined frequency and the receiving station being provided with means for radiating to the sending station a signal modulated at a frequency bearing a predetermined relationship to the first mentioned modulating frequency with the modulation of the last mentioned signal bearing a fixed phase relationship with the modulation of the first mentioned signal, means at the sending station to provide a set of signals of different frequencies bearing a predetermined frequency relationship to the first mentioned modulating frequency and in predetermined phase relationship with the modulation of the signal radiated from the sending station, means at the sending station responsive to the signal from the receiving station to provide a second set of signals of different frequencies equal to those of the first mentioned set of signals and bearing a predetermined phase relationship with the modulation of the signal received from the receiving station, and means for comparing the phase relationship of each pair of signals of the two sets having the same frequency.

3. A ranging system comprising a sending station and a receiving station, the sending station being provided with means for radiating to the receiving station a signal in the form of a light beam modulated at a single predetermined frequency and the receiving station being provided with means for radiating to the sending station a signal in the form of a light beam modulated at a frequency bearing a predetermined relationship to the first mentioned modulating frequency with the modulation of the last mentioned signal bearing a fixed phase relationship with the modulation of the first mentioned signal, means at the sending station to provide a set of signals of different frequencies bearing a predetermined frequency relationship to the first mentioned modulating frequency and in predetermined phase relationship with the modulation of the signal radiated from the sending station, means at the sending station responsive to the signal from the receiving station to provide a second set of signals of different frequencies equal to those of the first mentioned set of signals and bearing a predetermined phase relationship with the modulation of the signal received from the receiving station, and means for comparing the phase relationship of each pair of signals of the two sets having the same frequency.

4. A ranging system comprising a sending station and a receiving station, the sending station being provided with means for radiating to the receiving station a signal modulated at a single predetermined frequency and the receiving station being provided with means for radiating to the sending station a signal modulated at a frequency bearing a predetermined relationship to the first mentioned modulating frequency with the modulation of the last mentioned signal bearing a fixed phase relationship with the modulation of the first mentioned signal, means at the sending station to provide a set of signals of different frequencies bearing a predetermined frequency relationship to the first mentioned modulating frequency and in predetermined phase relationship with the modulation of the signal radiated from the sending station, means at the sending station responsive to the signal from the receiving station to provide a second set of signals of different frequencies equal to those of the first mentioned set of signals and bearing a predetermined phase relationship with the modulation of the signal received from the receiving station, and means, including a plurality of phase shifting devices and a plurality of cathode ray phase indicators, for comparing the phase relationship of each pair of signals of the two sets having the same frequency.

ALFRED C. WINTERHALTER.

References Cited in the file of this patent

UNITED STATES PATENTS

| Number | Name | Date |
|---|---|---|
| 1,969,537 | Alexanderson | Aug. 7, 193_ |
| 2,234,329 | Wolff | Mar. 11, 194_ |
| 2,248,727 | Strobel | July 8, 194_ |
| 2,404,696 | Deal | July 23, 194_ |
| 2,470,787 | Nosker | May 24, 194_ |
| 2,529,510 | Manley | Nov. 14, 195_ |

FOREIGN PATENTS

| Number | Country | Date |
|---|---|---|
| 581,568 | Great Britain | Oct. 17, 194_ |
| 708,277 | France | Apr. 28, 193_ |

OTHER REFERENCES

Ultra-High-Frequency Techniques by Brainerd et al., published by Van Nostrand Co., New York city, 1942, page 214.